United States Patent
Corl

(10) Patent No.: US 12,490,936 B2
(45) Date of Patent: Dec. 9, 2025

(54) SMART INTERFACE CABLE FOR COUPLING A DIAGNOSTIC MEDICAL DEVICE WITH A MEDICAL MEASUREMENT SYSTEM

(71) Applicant: Volcano Corporation, San Diego, CA (US)

(72) Inventor: Paul Douglas Corl, Palo Alto, CA (US)

(73) Assignee: PHILIPS IMAGE GUIDED THERAPY CORPORATION, San Diego, CA (US)

( * ) Notice: Subject to any disclaimer, the term of this patent is extended or adjusted under 35 U.S.C. 154(b) by 1384 days.

(21) Appl. No.: 14/212,989

(22) Filed: Mar. 14, 2014

(65) Prior Publication Data

US 2014/0276143 A1 Sep. 18, 2014

Related U.S. Application Data

(60) Provisional application No. 61/788,098, filed on Mar. 15, 2013.

(51) Int. Cl.
*A61B 5/00* (2006.01)
*A61B 5/0215* (2006.01)

(52) U.S. Cl.
CPC .......... *A61B 5/6851* (2013.01); *A61B 5/0215* (2013.01); *A61B 2562/225* (2013.01)

(58) Field of Classification Search
CPC ..... A61B 5/0215; A61B 5/6851; A61B 5/026; A61B 5/02158; A61B 5/6852; A61B 5/743; A61B 5/021; A61B 2562/0247; A61B 5/02
See application file for complete search history.

(56) References Cited

U.S. PATENT DOCUMENTS

| | | | |
|---|---|---|---|
| 5,715,827 A | 2/1998 | Corl | |
| 8,545,416 B1 * | 10/2013 | Kayyali | A61B 5/0205 128/204.26 |
| 2003/0018273 A1 * | 1/2003 | Corl | G01L 19/149 600/486 |
| 2004/0082866 A1 * | 4/2004 | Mott | A61B 5/0215 600/486 |

(Continued)

FOREIGN PATENT DOCUMENTS

WO WO 2001/013779 * 3/2001

*Primary Examiner* — Jennifer Robertson
*Assistant Examiner* — Karen E Toth

(57) ABSTRACT

The present disclosure involves a medical device. The medical device includes an elongate cable assembly having a distal connector, a proximal connector, and a cable body coupling the proximal and distal connectors. The distal connector is configured for coupling with a diagnostic medical device. The proximal connector is configured for coupling with a medical measurement system. An electronic component is located inside the distal connector or the associated cable housing. The electronic component includes an analog-to-digital converter (ADC) and a microprocessor. The ADC is configured to receive medical data gathered by the diagnostic medical device and convert the medical data into digital signals. The microprocessor is coupled to an output of the ADC and configured to process the digital signals into a format that is readable by the medical measurement system.

21 Claims, 9 Drawing Sheets

(56) References Cited

U.S. PATENT DOCUMENTS

| | | | | |
|---|---|---|---|---|
| 2004/0230126 A1* | 11/2004 | Pingel | ............... | A61B 5/0402 |
| | | | | 600/509 |
| 2005/0165323 A1* | 7/2005 | Montgomery | ....... | A61B 5/0006 |
| | | | | 600/544 |
| 2006/0095539 A1* | 5/2006 | Renkis | ............ | G08B 13/19641 |
| | | | | 709/217 |
| 2007/0106165 A1* | 5/2007 | Tulkki | ................ | A61B 5/6851 |
| | | | | 600/486 |
| 2007/0208245 A1* | 9/2007 | Brauker | ............ | A61B 5/14532 |
| | | | | 600/365 |
| 2009/0075610 A1* | 3/2009 | Keehr | ................ | H04B 1/1018 |
| | | | | 455/137 |
| 2010/0279550 A1* | 11/2010 | Rulken | ............... | C08G 69/265 |
| | | | | 228/101 |
| 2011/0287665 A1* | 11/2011 | Chien | .................... | F21S 6/003 |
| | | | | 439/638 |
| 2011/0304464 A1* | 12/2011 | Nelson | ................... | F16P 3/147 |
| | | | | 340/573.1 |
| 2012/0289799 A1* | 11/2012 | Delianides | ......... | A61B 5/02416 |
| | | | | 600/322 |
| 2013/0023770 A1* | 1/2013 | Courtney | ............ | A61M 39/223 |
| | | | | 600/467 |
| 2013/0046190 A1 | 2/2013 | Davies | | |
| 2013/0190633 A1 | 7/2013 | Dorando | | |
| 2014/0012148 A1* | 1/2014 | Amit | ................. | A61B 5/04014 |
| | | | | 600/509 |

\* cited by examiner

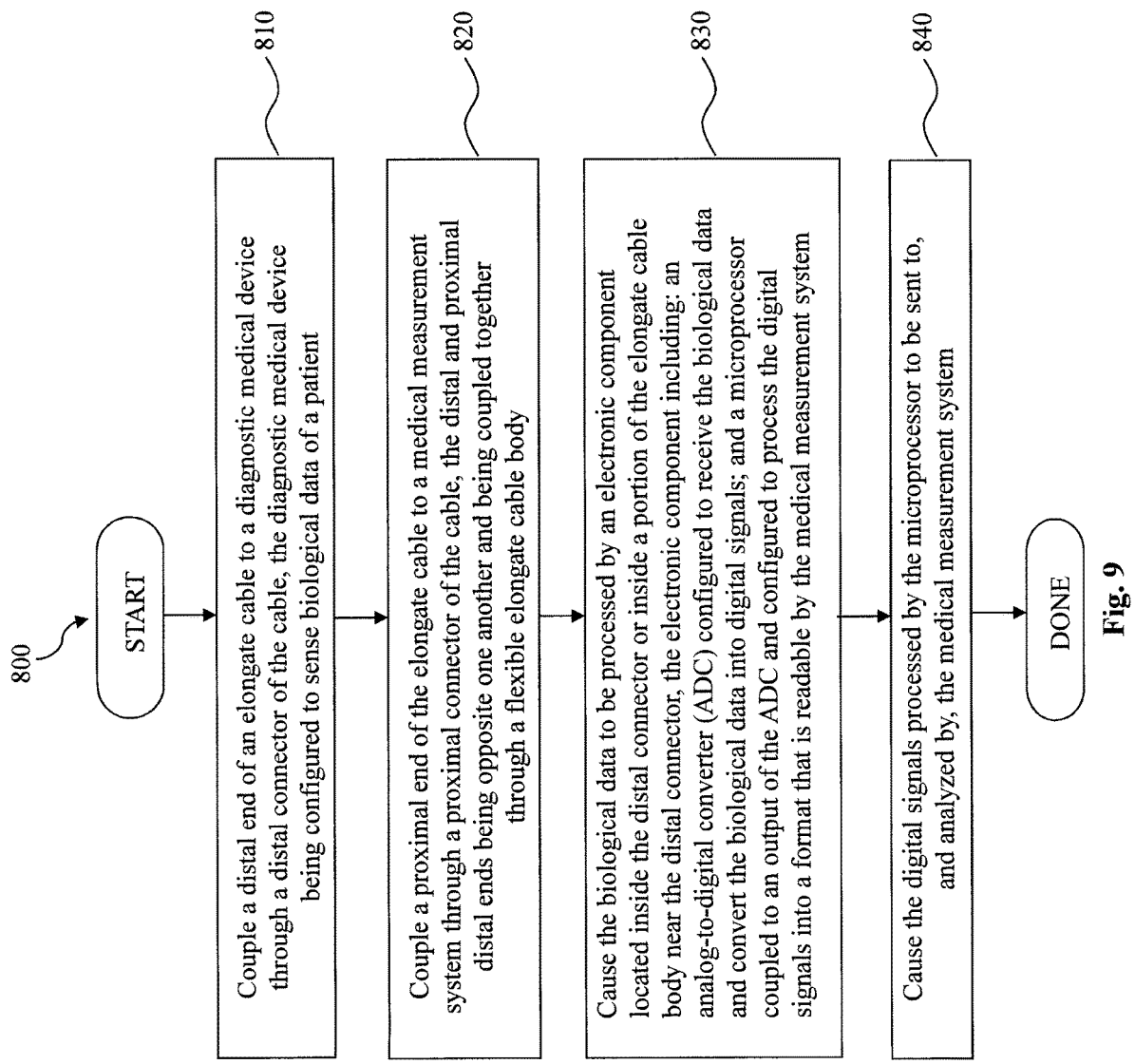

SMART INTERFACE CABLE FOR COUPLING A DIAGNOSTIC MEDICAL DEVICE WITH A MEDICAL MEASUREMENT SYSTEM

CROSS-REFERENCE TO RELATED APPLICATIONS

The present application claims priority to and the benefit of U.S. Provisional Patent Application No. 61/788,098, filed Mar. 15, 2013, which is hereby incorporated by reference in its entirety.

TECHNICAL FIELD

The present disclosure relates generally to a smart interface cable, and in particular, to a cable capable of serving as an interface between a diagnostic medical device and a medical measurement system.

BACKGROUND

In the modern catheterization lab or other hospital setting, measurement instruments or systems may be utilized in combination with remote diagnostic medical devices to obtain critical medical measurement data. For example, a hemodynamic monitoring system may work in conjunction with a pressure measuring guidewire to record the blood pressure distal to a partial blockage in a coronary artery within a patient while a separate device such as a guiding catheter is used to record aortic pressure proximal to the blockage. Certain miniature pressure guidewires cannot deliver their pressure signals directly to a hemodynamic monitoring system. Conventionally, some manufacturers have used an electronic device as an interface between the pressure guidewire and the hemodynamic monitoring system. Such electronic device converts a pressure sensor output of the pressure guidewire into a format compatible with the hemodynamic monitoring system. However, the electronic interface device still occupies valuable space within the catheterization laboratory even though it may be small. Moreover, the electronic interface device may require additional cabling. For example, one cable may be needed to connect a first port of the electronic interface device to the pressure guidewire, with a different cable needed to connect a second port of the electronic interface device to the hemodynamic monitoring system, and still another cable possibly required to supply electrical power to the electronic interface. These cables lead to clutter and increase the potential for operator errors. Furthermore, the electronic interface device may also be expensive.

Therefore, there remains a need to simplify the interface between a pressure measuring guidewire and a hemodynamic monitoring system.

SUMMARY

One aspect of the present disclosure involves a medical device. The medical device includes: a cable having a distal connector configured for coupling with a diagnostic medical device, a proximal connector configured for coupling with a medical measurement system, and a elongate cable body coupling the distal and proximal connectors; and an electronic component located inside a housing associated with the distal connector, the electronic component including: an analog-to-digital converter (ADC) configured to receive biological data gathered by the diagnostic medical device and convert the biological data into digital signals; and a microprocessor coupled to an output of the ADC and configured to process the digital signals into a format that is readable by the medical measurement system.

Another aspect of the present disclosure involves a medical device. The medical device includes: a diagnostic medical device configured to sense biological data of a patient; a rotary cable assembly coupled to the diagnostic medical device, the rotary cable including an elongate cable coupled to the diagnostic medical device and a connector coupled to the elongate cable, wherein the connector is configured for coupling with a medical measurement system; and an electronic component located adjacent to the connector or inside the connector housing, the electronic component including: an analog-to-digital converter (ADC) configured to receive the biological data gathered by the diagnostic medical device and convert the biological data into digital signals; and a microprocessor coupled to an output of the ADC and configured to process the digital signals into a format that is readable by the medical measurement system.

Yet another one aspect of the present disclosure involves a medical device. The medical device includes: a diagnostic device configured to obtain biological data from a patient; an elongated cable body having a distal connector configured for coupling with the diagnostic medical device, a proximal connector configured for coupling with a medical measurement system, and an elongate cable body coupling the distal and proximal connectors; and electronic circuitry located inside the distal connector or inside the housing associated with the distal connector, the electronic component including: an analog-to-digital converter (ADC) configured to receive the biological data gathered by the diagnostic medical device and convert the biological data into digital signals; and a microprocessor coupled to an output of the ADC and configured to process the digital signals into a format that is readable by the medical measurement system.

One more aspect of the present disclosure involves a method. The method includes: coupling a distal end of an elongate cable to a diagnostic medical device through a distal connector of the cable, the diagnostic medical device being configured to sense biological data of a patient; and coupling a proximal end of the elongate cable to a medical measurement system through a proximal connector of the cable, the distal and proximal distal ends being opposite one another and being coupled together through a flexible elongate cable body; and causing the biological data to be processed by an electronic component located inside the distal connector or inside the housing associated with the distal connector, the electronic component including: an analog-to-digital converter (ADC) configured to receive the biological data and convert the biological data into digital signals; and a microprocessor coupled to an output of the ADC and configured to process the digital signals into a format that is readable by the medical measurement system.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which:

FIG. 9 is simplified flowchart illustrating a method according to an aspect of the present disclosure.

DETAILED DESCRIPTION

Figure 1:
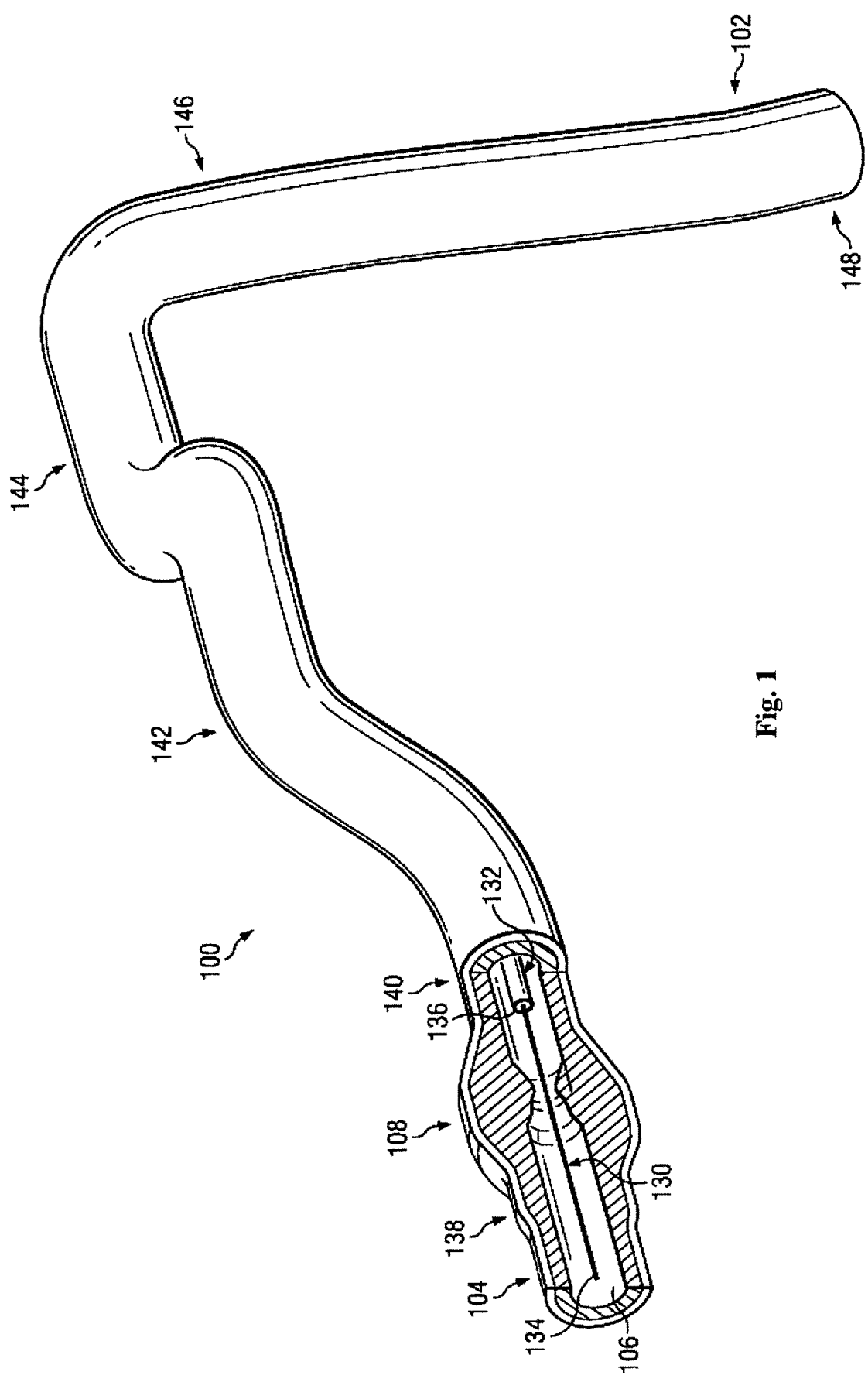
FIG. 1 is a diagrammatic, partial cross-sectional perspective view of a vessel with instruments positioned therein according to an embodiment of the present disclosure.

For the purpose of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

In recent years, technological progress has facilitated tremendous advances in diagnostic medical devices and medical measurement systems. In particular, pressure sensors based on microelectromechanical systems (MEMS) technology have been miniaturized to the point where a solid-state pressure sensor can be mounted within a guidewire, sufficiently small and flexible to be safely advanced into the coronary arteries and across a partial blockage to provide the critically important measurement of blood pressure distal to the obstruction. An example of such pressure guidewire technology is disclosed in U.S. Pat. No. 5,715,827 hereby incorporated by reference in its entirety. The acquired medical measurement data, including the aforementioned distal blood pressure information, is typically communicated to a hemodynamic monitoring system (an example medical measurement system) for display, analysis, and archiving. As an example of the analysis that can be performed by the hemodynamic monitoring system, fractional flow reserve (FFR) may be calculated to provide an index for assessing the clinical significance of a stenosis (a partial obstruction) in a blood vessel. FFR is typically calculated as the ratio of the distal pressure (measured distal to the stenosis with a pressure guidewire) to proximal pressure (measured proximal to the stenosis with a conventional catheter-based pressure measurement device). FFR provides an index of stenosis severity that quantifies the likely benefit of intervention (such as angioplasty and stent placement) to relieve the stenosis and open the artery. FFR measurement requires the administration of a hyperemic agent (a powerful drug), which is not always possible or advisable. To address this limitation (and other issues associated with FFR measurement), a proprietary measurement technique may be used to derive a quantity known as the instantaneous wave-free ratio (iFR). Like the FFR measurement, iFR is used to quantify the likely benefit of intervention to relieve the steno sis, but without the need for administration of the hyperemic agent. Additional details related to FFR and iFR measurement are disclosed in Provisional U.S. Patent Application No. 61/588,437, filed on Jan. 19, 2012, and entitled "Interface Devices, Systems, and Methods for Use with Intravascular Pressure Monitoring Devices", and U.S. patent application Ser. No. 13/460,296, filed on Apr. 30, 2012, and entitled "Devices, Systems, and Methods for Assessing a Vessel", each of which is hereby incorporated by reference in its entirety.

To facilitate the transmission and analysis of the medical measurement data, an electronic interface device may be deployed to serve as an interface between the diagnostic medical device and the medical measurement system. Typically, the signal outputs from a pressure guidewire are not directly compatible with a standard medical measurement system (e.g., conforming to the international standard ANSI/AAMI BP22:1994 Blood Pressure Transducers), and the signals from the pressure guidewire must be converted to a suitable format. However, the electronic interface device commonly used to convert these signals occupies precious space in the catheterization laboratory or other hospital setting and requires numerous cable connections, further complicating the issue. The electronic interface may require a cable to connect one port to a diagnostic medical device (such as a pressure guidewire), another cable to connect a second port of the medical measurement system (such as a hemodynamic monitoring system), and possibly another cable to connect the interface to a power source. This proliferation of cables leads to clutter and increases the potential for operator errors. Furthermore, the electronic interface device may also represent an expensive additional piece of equipment.

The present disclosure proposes using a smart cable as the interface between a diagnostic medical device and a medical measurement system, thereby replacing the bulky and expensive electronic interface device. The smart cable greatly simplifies the coupling arrangement between the diagnostic medical device and the medical measurement system. Various aspects of the smart cable are disclosed below in more detail with reference to FIGS. 1-9. As examples, a pressure guidewire is used herein as an embodiment of the diagnostic medical device, and a hemodynamic monitoring system is used herein as an embodiment of the medical measurement system. However, it is understood that other types of medical sensing devices may be used as the diagnostic medical device to collect various types of medical measurements, and that other suitable physiological monitoring systems may be used as the medical measurement system to display and analyze the acquired medical measurements.

Referring now to FIG. 1, the vessel 100 is shown with instruments 130 and 132 positioned therein as example diagnostic medical devices according to an embodiment of the present disclosure. In general, instruments 130 and 132 may be any form of device, instrument, or probe sized and shaped to be positioned within a vessel. In the illustrated embodiment, instrument 130 is generally representative of a guidewire, while instrument 132 is generally representative of a catheter. In that regard, instrument 130 extends through a central lumen of instrument 132. However, in other embodiments, the instruments 130 and 132 take other forms. In that regard, the instruments 130 and 132 are of similar form in some embodiments. For example, in some instances, both instruments 130 and 132 are guidewires. In other instances, both instruments 130 and 132 are catheters. On the other hand, the instruments 130 and 132 are of different form in some embodiments, such as the illustrated embodiment, where one of the instruments is a catheter and the other is a guidewire. Further, in some instances, the instruments 130 and 132 are disposed coaxial with one another, as shown in the illustrated embodiment of FIG. 1. In other instances, one of the instruments extends through an off-center lumen of the other instrument. In yet other instances, the instruments 130 and 132 extend side-by-side. In some particular embodiments, at least one of the instruments is as a rapid-exchange device, such as a rapid-exchange catheter. In such embodiments, the other instrument is a buddy wire or other device configured to facilitate the introduction and removal of the rapid-exchange device. Further still, in other instances, instead of two separate instruments 130 and 132 a single instrument is utilized. In that regard, the single instrument incorporates aspects of the functionalities (e.g., proximal and distal pressure measurement) of both instruments 130 and 132 in some embodiments.

Instrument 130 is configured to obtain diagnostic information about the vessel 100. In that regard, the instrument 130 is a diagnostic medical device that includes one or more sensors, transducers, and/or other monitoring elements configured to obtain the diagnostic information about the vessel. The diagnostic information obtained by the diagnostic medical device includes one or more of the following: pressure, flow, velocity, temperature, images (including images obtained using intravascular ultrasound (IVUS), optical coherence tomography (OCT), optical spectroscopy, thermal, and/or other imaging techniques), or combinations thereof. The one or more sensors, transducers, and/or other monitoring elements are positioned adjacent a distal portion of the instrument 130 in some instances. In that regard, the one or more sensors, transducers, and/or other monitoring elements are positioned less than 30 cm, less than 10 cm, less than 5 cm, less than 3 cm, less than 2 cm, and/or less than 1 cm from a distal tip 134 of the instrument 130 in some instances. In some instances, at least one of the one or more sensors, transducers, and/or other monitoring elements is positioned at the distal tip of the instrument 130.

The instrument 130 includes at least one element configured to monitor a medical parameter within the vessel 100. In the illustrated embodiment, blood pressure is the medical parameter being monitored, though other medical parameters may be monitored in different embodiments. The pressure monitoring element can take the form a piezoresistive pressure sensor, a piezoelectric pressure sensor, a capacitive pressure sensor, an electromagnetic pressure sensor, a fluid column (the fluid column being in communication with a fluid column sensor that is separate from the instrument and/or positioned at a location within the instrument proximal of the fluid column), an optical pressure sensor, and/or combinations thereof. In some instances, one or more features of the pressure monitoring element are implemented as a solid-state component manufactured using MEMS techniques and/or other semiconductor wafer manufacturing methods. Examples of commercially available guidewire products that include suitable pressure monitoring elements include, without limitation, the PrimeWire PRESTIGE® PLUS pressure guidewire, the PrimeWire PRESTIGE® pressure guidewire, the PrimeWire® pressure guidewire, and the ComboWire® XT pressure and flow guidewire, each available from Volcano Corporation. Generally, the instrument 130 is sized such that it can be advanced through the stenosis 108 without significantly impairing flow through the stenosis and without significantly affecting the distal pressure reading. Accordingly, in some instances the instrument 130 has an outer diameter of 0.018" or less. In some embodiments, the instrument 130 has an outer diameter of 0.014" or less.

Instrument 132 is also configured to obtain diagnostic information about the vessel 100. In some instances, instrument 132 is configured to obtain the same diagnostic information as instrument 130. In other instances, instrument 132 is configured to obtain different diagnostic information than instrument 130, which may include additional diagnostic information, less diagnostic information, and/or alternative diagnostic information. The diagnostic information obtained by instrument 132 includes one or more of pressure, flow, velocity, temperature, images (including images obtained using IVUS, OCT, optical spectroscopy, thermal, and/or other imaging techniques), or combinations thereof. Instrument 132 includes one or more sensors, transducers, and/or other monitoring elements configured to obtain this diagnostic information. In that regard, the one or more sensors, transducers, and/or other monitoring elements are positioned adjacent a distal portion of the instrument 132 in some instances. In that regard, the one or more sensors, transducers, and/or other monitoring elements are positioned less than 30 cm, less than 10 cm, less than 5 cm, less than 3 cm, less than 2 cm, and/or less than 1 cm from a distal tip 136 of the instrument 132 in some instances. In some instances, at least one of the one or more sensors, transducers, and/or other monitoring elements is positioned at the distal tip of the instrument 132. In some instances, the sensor associated with instrument 132 may be located outside the body, connected to instrument 132 via fluid-filled pressure tubing, in which case there might be no actual sensor positioned near the tip of instrument 132 but the biological measurement to be obtained (such as pressure within the blood vessel) would be communicated through the fluid-filled catheter and tubing to an external sensor.

Similarly to instrument 130, instrument 132 includes at least one element configured to monitor a medical parameter within the vessel 100. In the illustrated embodiment, blood pressure is the medical parameter being monitored, though other medical parameters may be monitored in different embodiments. The pressure monitoring element can take the form a piezoresistive pressure sensor, a piezoelectric pressure sensor, a capacitive pressure sensor, an electromagnetic pressure sensor, a fluid column (the fluid column being in communication with a fluid column sensor that is separate from the instrument and/or positioned at a location within the instrument proximal of the fluid column), an optical pressure sensor, and/or combinations thereof. In some instances, one or more features of the pressure monitoring element are implemented as a solid-state component manufactured using MEMS techniques and/or other semiconductor wafer manufacturing methods. Currently available catheter products suitable for use with one or more of Siemens AXIOM Sensis, Mennen Horizon XVu, and Philips Xper IM Physiomonitoring 5 and that include pressure monitoring elements can be utilized for instrument 132 in some instances.

In accordance with aspects of the present disclosure, at least one of the instruments 130 and 132 is configured to monitor a pressure within the vessel 100 distal of the stenosis 108 and at least one of the instruments 130 and 132 is configured to monitor a pressure within the vessel proximal of the stenosis. In that regard, the instruments 130, 132 are sized and shaped to allow positioning of the at least one element configured to monitor pressure within the vessel 100 to be positioned proximal or distal to the stenosis 108 as necessary based on the configuration of the devices. In that regard, FIG. 1 illustrates a position 138 suitable for measuring pressure distal of the stenosis 108. The position 138 is typically at least several vessel diameters beyond the distal end of the stenosis 108 in some instances. FIG. 1 also illustrates a plurality of suitable positions for measuring pressure proximal of the stenosis 108. In that regard, positions 140, 142, 144, 146, and 148 each represents a position that is suitable for monitoring the pressure proximal of the stenosis in some instances. Generally, the proximal pressure measurement is taken at a distance greater than one vessel diameter proximal to the stenosis, and the positions 140, 142, 144, 146, and 148 illustrate locations at varying distances from the proximal end of the stenosis 108 ranging from more than 20 cm down to about 5 mm or less. Generally, there is little difference between the pressure measured in the aorta and the pressure measured in any more distal location that is still proximal to the stenosis. In some instances, the proximal pressure measurement is referred to as the aortic pressure, whether it is measured in the aorta or within a proximal segment of the coronary artery distal to the aorta.

Figure 2:
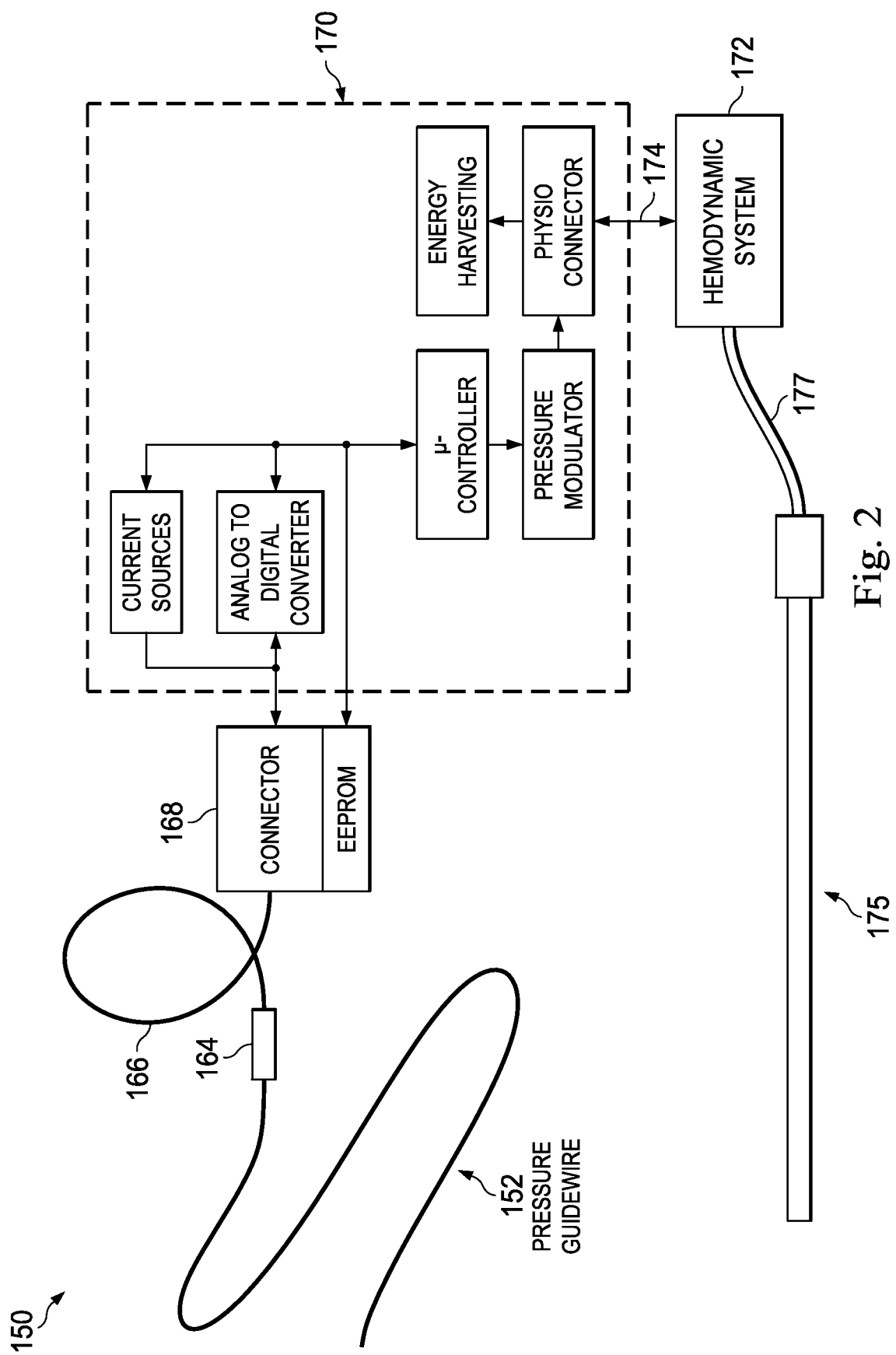
FIG. 2 is a diagrammatic, schematic view of a system according to an embodiment of the present disclosure.

Referring now to FIG. 2, shown therein is a medical system 150 according to an embodiment of the present disclosure. In that regard, FIG. 2 is a simplified diagrammatic, schematic view of the system 150 and may not illustrate all the components in the system 150. As shown, the system 150 includes an instrument 152. In that regard, in some instances, the instrument 152 is suitable for use as at least one of instruments 130 and 132 discussed above in FIG. 1. Accordingly, the instrument 152 includes features similar to those discussed above with respect to instruments 130 and 132 in some instances.

Figure 3:
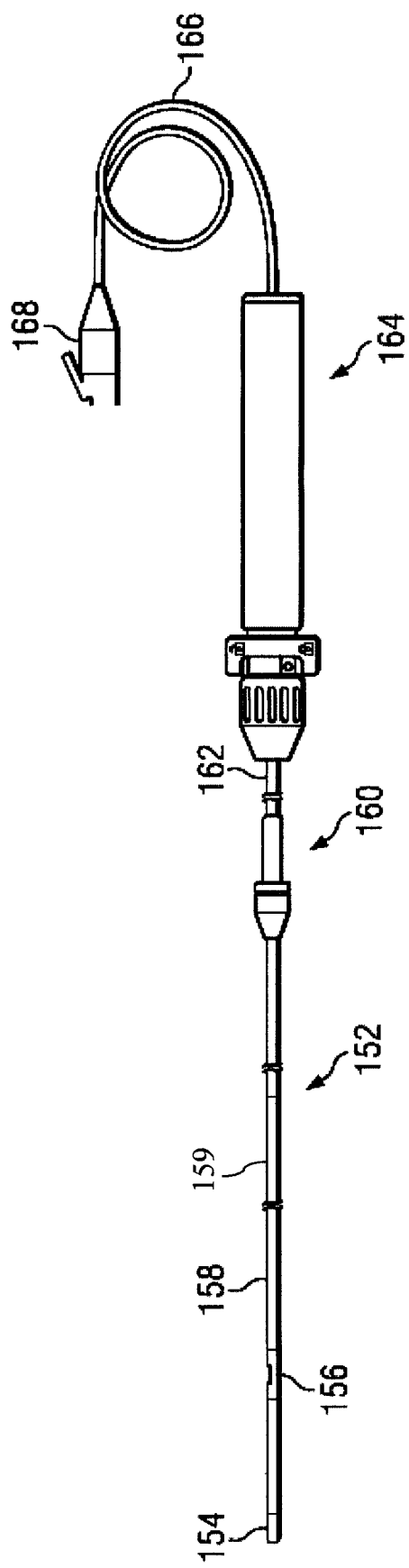
FIG. 3 is a more detailed diagrammatic view of a diagnostic medical device of the system of FIG. 2 according to an embodiment of the present disclosure.

In the illustrated embodiment, the instrument 152 is implemented as a pressure guidewire and may hereinafter be interchangeably referred to as such. FIG. 3 is a more detailed illustration of the pressure guidewire 152. Referring to FIG. 3, the pressure guidewire 152 has a distal portion 154 and a housing 156 positioned adjacent the distal portion. In that regard, the housing 156 is spaced approximately 3 cm from a distal tip of the pressure guidewire 152. The housing 156 is configured to house one or more sensors, transducers, and/or other monitoring elements configured to obtain diagnostic information about the vessel. In the illustrated embodiment, the housing 156 contains at least a pressure sensor configured to monitor a pressure within a lumen in which the pressure guidewire 152 is positioned. A flexible segment 158 of the guidewire extends proximally from the housing to a point approximately 30 cm proximal to the distal tip of the guidewire where it joins a less flexible shaft 159 extending to the proximal end of the guidewire. A torque device 160 is positioned over and coupled to a proximal portion of the shaft 159. A proximal end portion 162 of the pressure guidewire 152 is coupled to a rotary connector 164. A cable 166 extends from rotary connector 164 to a connector 168. In some instances, connector 168 is configured to be plugged into an electronic interface device. However, according to the present disclosure, instead of plugging into the electronic interface device, the connector 168 will be plugged into a smart cable. The rotary connector 164, the cable 166, and the connector 168 may also be collectively referred to as a rotary cable assembly.

Referring back to FIG. 2, the smart cable is illustrated as a simplified functional block 170. The smart cable 170 includes electrical circuitry implemented inside a portion of the smart cable 170 close to the pressure guidewire 152. The circuitry is preferably positional in close proximity to the pressure guidewire 152 so as to better receive (or preserve the integrity of) the pressure data collected by the pressure guidewire 152. The electrical circuitry allows the smart cable 170 to serve as an electrical interface and communication pathway between the pressure guidewire 152 and a medical measurement system (such as a hemodynamic monitoring system). Among other things, the electrical circuitry of the smart cable 170 includes an energy harvesting component, a current sources component, an analog-to-digital converter (ADC) component, a microcontroller component, and a modulator component. The energy harvesting component harvests energy from the excitation signal present on any standard pressure sensor port of the hemodynamic monitoring system. The harvested energy provides the electrical power needed to operate the electrical circuitry of the smart cable 170. The microcontroller component queries the calibration memory of the pressure guidewire, typically included inside or adjacent to the connector 168 of the rotary cable assembly, and it reads the calibration coefficients associated with the particular pressure guidewire sensor. Based on the calibration coefficients, the microcontroller then activates the current sources component to provide the appropriate excitation to the pressure sensor included in the pressure guidewire. Also based on the calibration coefficients, the microcontroller initializes the ADC component and then reads the digitized raw pressure signals acquired from the pressure sensor by the ADC component. The ADC component is a high resolution ADC, such as a 24-bit ADC capable of digitizing signals with microvolt resolution and accuracy. The digitized raw pressure signal provided by the ADC component is processed by the microcontroller component using the calibration coefficients to derive a calibrated pressure signal. The calibrated pressure signal is finally supplied to the modulator component where it modulates the excitation signal from the pressure sensor port of the hemodynamic monitoring system, generating the modulated response waveform required for compatibility with the hemodynamic monitoring system and representing the measured blood pressure. Typically, the hemodynamic monitoring system conforms to the ANSI/AAMI BP22:1994 Blood Pressure Transducer standard which specifies the form of the excitation waveform and the modulated pressure signal. The smart cable 170 and its electrical components are discussed in greater detail below.

Still referring to FIG. 2, the system 150 includes a medical measurement system, such as a hemodynamic monitoring system 172, that is coupled to the smart cable 170 via a connection 174. In some instances, the hemodynamic monitoring system 172 is a Siemens AXIOM Sensis, a Mennen Horizon XVu, or a Philips Xper IM Physiomonitoring 5. Together, connector 164, cable 166, connector 168, and the smart cable 170 facilitate communication between the one or more sensors, transducers, and/or other monitoring elements of the pressure guidewire 152 and the hemodynamic monitoring system 172. However, this communication pathway is exemplary in nature and should not be considered limiting in any way.

The system 150 also includes an instrument 175. In some instances, the instrument 175 is suitable for use as at least one of instruments 130 and 132 discussed above. Accordingly, in some instances, the instrument 175 includes features similar to those discussed above with respect to instruments 130 and 132. In the illustrated embodiment, the instrument 175 is a catheter that includes a fluid column extending along its length. In such an embodiment, a hemostasis valve is fluidly coupled to the fluid column of the catheter, a manifold is fluidly coupled to the hemostasis valve, and fluid-filled tubing extends from the manifold to an external pressure sensor (outside the body). Thus, the fluid column of the catheter is in fluid communication with a pressure sensor via the valve, manifold, and tubing, such that the instrument 175 is configured to deliver the blood pressure at the tip of the catheter through fluid-filled tubing to a pressure sensor external to the patient. By delivering the pressure at the tip of the catheter to an external pressure transducer, the instrument 175 facilitates the monitoring of the pressure within a vessel lumen in which is the catheter tip is positioned. In some instances, the pressure sensor is part of (or in communication with) the hemodynamic monitoring system 172.

In some embodiments, the hemodynamic monitoring system 172 is capable of electronically normalizing the pressures sensed by the guidewire 152 and by the aortic pressure sensing instrument 175. For normalization, the pressure guidewire 152 is positioned to record the pressure at the same location as instrument 175, such that both are expected to provide precisely the same pressure reading. The hemodynamic monitoring system detects any discrepancy in offset between the two measured pressures, and adds a constant to all subsequent guidewire pressure reading to provide a normalized pressure reading from the pressure guidewire. This normalization process removes many sources of error that could otherwise degrade the quality of analyses that utilize both pressure readings. In certain embodiments, normalization may also be mechanically performed by using the aortic sensor height adjustment to equalize the aortic and guidewire pressures. For this to be successful, the pressure guidewire is configured to ensure a small initial offset (e.g., within +/−5 mm) and accurate scale factor, while the smart cable 170 is also configured to include an ambient pressure transducer to allow it to simulate a gauge pressure measurement using the absolute pressure sensor contained in the pressure guidewire. Under these conditions, the small offset between the aortic and guidewire pressure readings can be compensated by moving the aortic pressure transducer up or down in elevation by a few inches.

It is understood that one or more components of the system 150 are not included, are implemented in a different arrangement/order, and/or are replaced with an alternative device/mechanism in other embodiments of the present disclosure. Alternatively, additional components and/or devices may be implemented into the system. Generally speaking, the communication pathway between either or both of the instruments 152, 175 and the hemodynamic monitoring system 172 may have no intermediate nodes (i.e., a direct connection).

The hemodynamic monitoring system 172 receives a distal pressure waveform and a proximal (aortic) pressure waveform, for example gathered by the pressure guidewire 152 and the instrument 175. The hemodynamic monitoring system may include a computing device capable of processing and analyzing such received data. For example, the computing device may include a computer system with the necessary hardware and software to acquire, process, and display multi-modality medical data. In some instances, the computing device utilizes the distal pressure waveform with the proximal pressure waveform to calculate FFR, iFR, pressure differential between the proximal and distal pressures, or any other parameter derived from this set of pressure waveforms. The computing device may also be used to identify a suitable window within the cardiac cycle to be used for calculating iFR or other indices useful for assessing the significance of a lesion without the need to administer a hyperemic agent to the patient. In some embodiments, the hemodynamic monitoring system 172 complies with the ANSI/AAMI BP22:1994 Blood Pressure Transducer standard, which defines a range of excitation signals and a sensitivity for the response to pressure.

Figure 4:
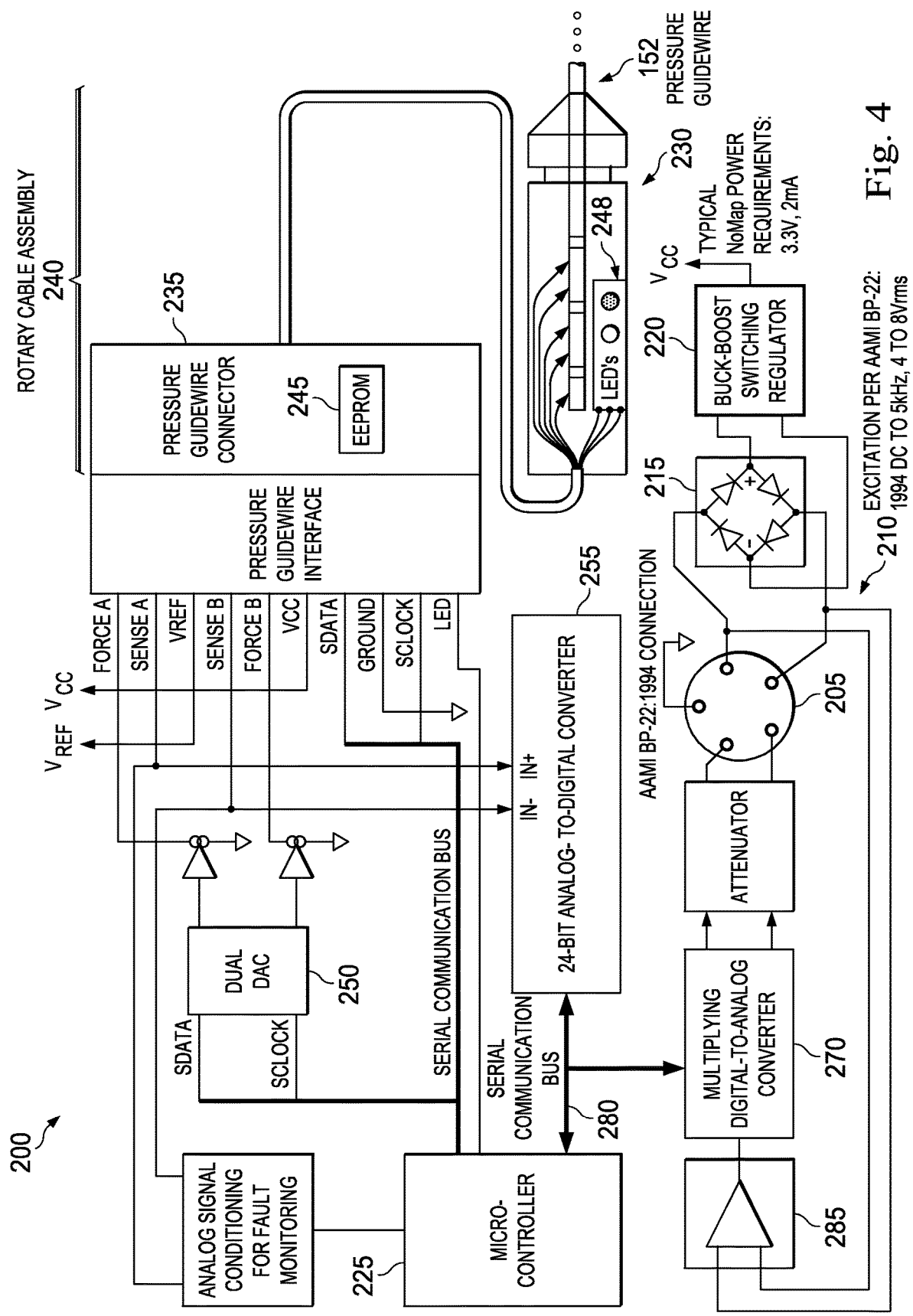
FIG. 4 is a schematic diagram of the circuitry located inside a smart cable of the system of FIG. 2 according to an embodiment of the present disclosure.

FIG. 4 is a more detailed block diagram of the electrical circuitry 200 contained inside the smart cable 170. As discussed above, the circuitry is coupled to (or includes) a connector 205, which is configured to be plugged into the hemodynamic monitoring system 172. In the illustrated embodiment, the hemodynamic monitoring system 172 provides a pressure transducer interface via connector 205 in compliance with the ANSI/AAMI BP22:1994 Blood Pressure Transducer standard. The circuitry 200 harvests a small amount of electrical power from the excitation signal 210 to operate the low power (typically <10 mW) circuitry. Whether the excitation signal 210 is AC or DC, a bridge rectifier 215 of the circuitry 200 transforms the excitation signal 210 into a DC voltage of the correct polarity. That DC voltage is stepped up or down by a buck-boost switching regulator 220 to efficiently provide a stable 3.3V supply to power the circuitry 200.

Once the circuitry 200 is powered up, a microcontroller 205 initializes all of the components of the circuitry 200, and waits for a pressure guidewire 230 (implemented as the pressure guidewire 152 of FIGS. 2-3 in some embodiments) and including the associated rotary cable assembly 240, to be connected to a pressure guidewire interface connector 235. The microcontroller 225 detects the presence of a pressure guidewire rotary cable assembly 240 by attempting to read a pressure guidewire EEPROM 245. A successful read operation indicates the presence of the connector, and the microcontroller 225 then reads all of the guidewire calibration coefficients from the EEPROM 245 (which is programmed specifically for the associated guidewire pressure sensor).

It is understood that the rotary cable assembly 240 may be considered to be separate from, and not a part of, the smart cable 170 (and thus separate from the circuitry 200). The rotary cable assembly 240 is illustrated herein for clarifying the electrical connections between the components of the circuitry 200 and the pressure guidewire. Also, in the embodiment shown in FIG. 4, the rotary cable assembly 240 includes a light-emitting diode (LED) mechanism 248. The status indication mechanism 248 includes differently colored LEDs to indicate the status of the smart cable 170, for example "pressure guidewire not connected," "initializing," and "ready-to-use." It is understood, however, that a similar status indication mechanism may be implemented on the smart cable 170 itself in other embodiments.

Still referring to FIG. 4, once the microcontroller 225 has acquired the calibration coefficients for the pressure guidewire 230, it loads the appropriate setup parameters for the particular device into a dual digital-to-analog converter 250 to supply excitation currents to the pressure sensor via the FORCE-A and FORCE-B connections. In this example, the pressure sensor is a piezoresistive sensor in a half-bridge form, and the circuitry 200 performs temperature compensation by programming the ratio of the two excitation currents to provide equal temperature response for each leg of the half-bridge circuit (based on the temperature coefficient parameter stored in the calibration EEPROM 245). The microcontroller 225 also sets up a 24-bit analog-to-digital converter 255 with the appropriate gain, considering the pressure sensor sensitivity (also based on the calibration data from EEPROM 245).

The microcontroller 225 continuously monitors the voltages on the SENSE-A and SENSE-B lines as well as other parameters of interest via low resolution analog-to-digital converters included in the microcontroller 225. From these measurements, the microcontroller 225 can detect various fault conditions, such as "guidewire not connected", "guidewire shorted", "guidewire open circuit", etc. These fault conditions can be communicated to the operator via the status indication mechanism 248 or via signals sent to the hemodynamic monitoring system.

Once the microcontroller 225 detects a properly connected pressure guidewire 230, it uses the high-resolution 24-bit analog-to-digital converter (ADC) 255 to measure the differential voltage across the half-bridge pressure sensor, a voltage which is proportional to the applied pressure. The microcontroller 225 conditions this voltage to correct for the zero offset and pressure sensitivity, two of the calibration parameters stored in the calibration EEPROM 245 inside the pressure guidewire connector 235 of the rotary cable assembly 240. Raw pressure samples are typically acquired by the 24-bit ADC 255 at a rate of 200 samples per second to faithfully capture the physiologic pressure waveform, and each sample is conditioned to provide a calibrated digital value representing the blood pressure at one instant in time.

The conditioned pressure values are transferred to a modulator circuit, for example, a multiplying digital-to-analog converter (MDAC) 270, to be converted into the proper format for compatibility with the pressure interface of the hemodynamic monitoring system 172 for analysis and display. Since the conditioned pressure samples are in a digital format, and the BP-22 excitation waveform is an analog signal, the MDAC 270 is used to modulate the pressure waveform and produce the required analog output. The microcontroller 225 delivers the pressure samples to the MDAC 270 via a serial data bus 280 (also shared with the 24-bit ADC 255). A differential amplifier 285 conditions and buffers the excitation waveform and delivers the signal to the analog input of the MDAC 270. The output from the MDAC 270 is attenuated to meet the ANSI/AAMI BP22:1994 Blood Pressure Transducer standard for sensitivity (5 uV/V/mmHg) and this modulated pressure waveform is returned to the hemodynamic monitoring system 172 inputs via connector 205.

Figure 5:
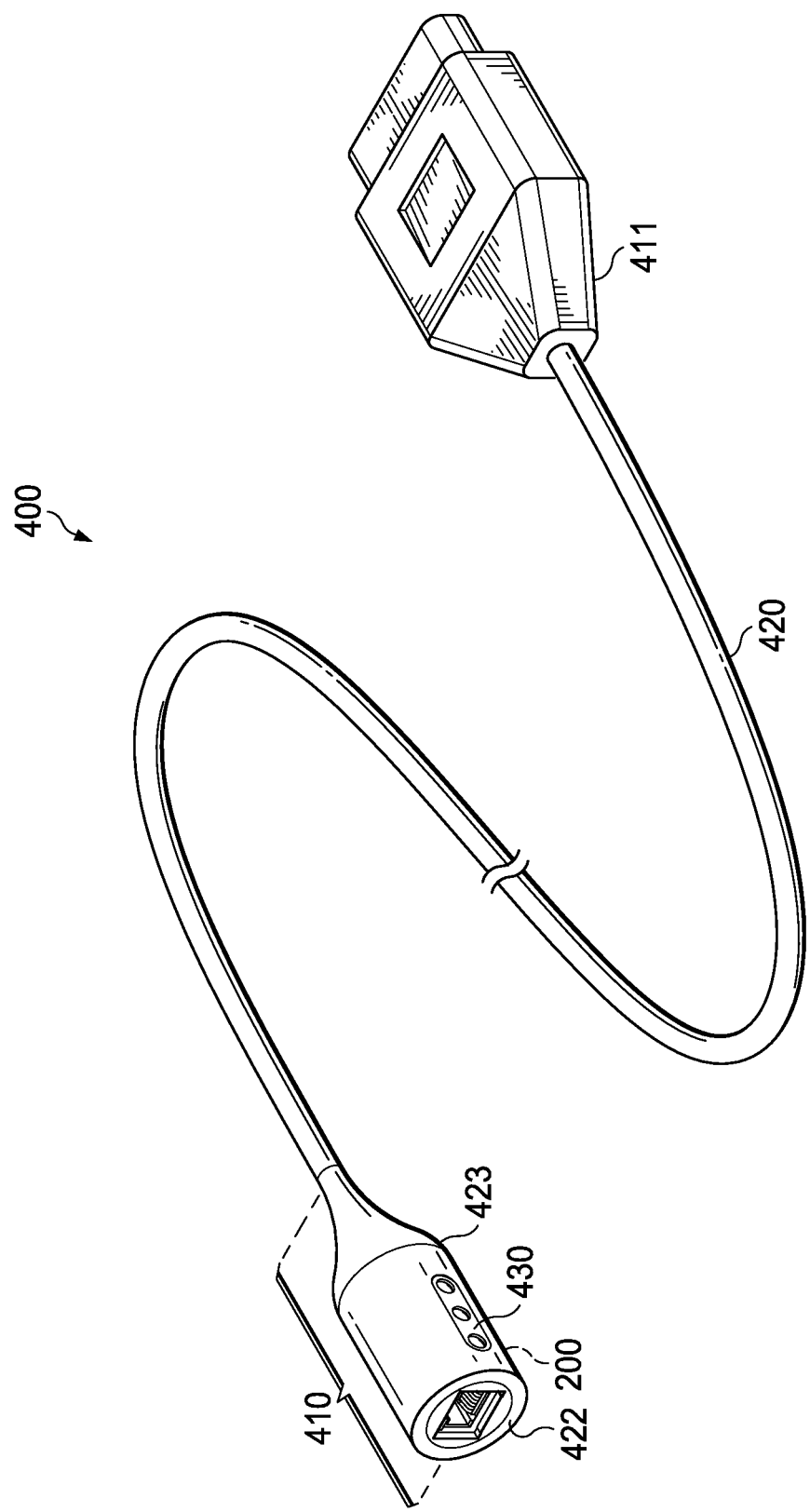
FIGS. 5-7 are diagrammatic views illustrating the form factor of the smart cable of FIG. 2 according to different embodiments of the present disclosure.
Figure 6:
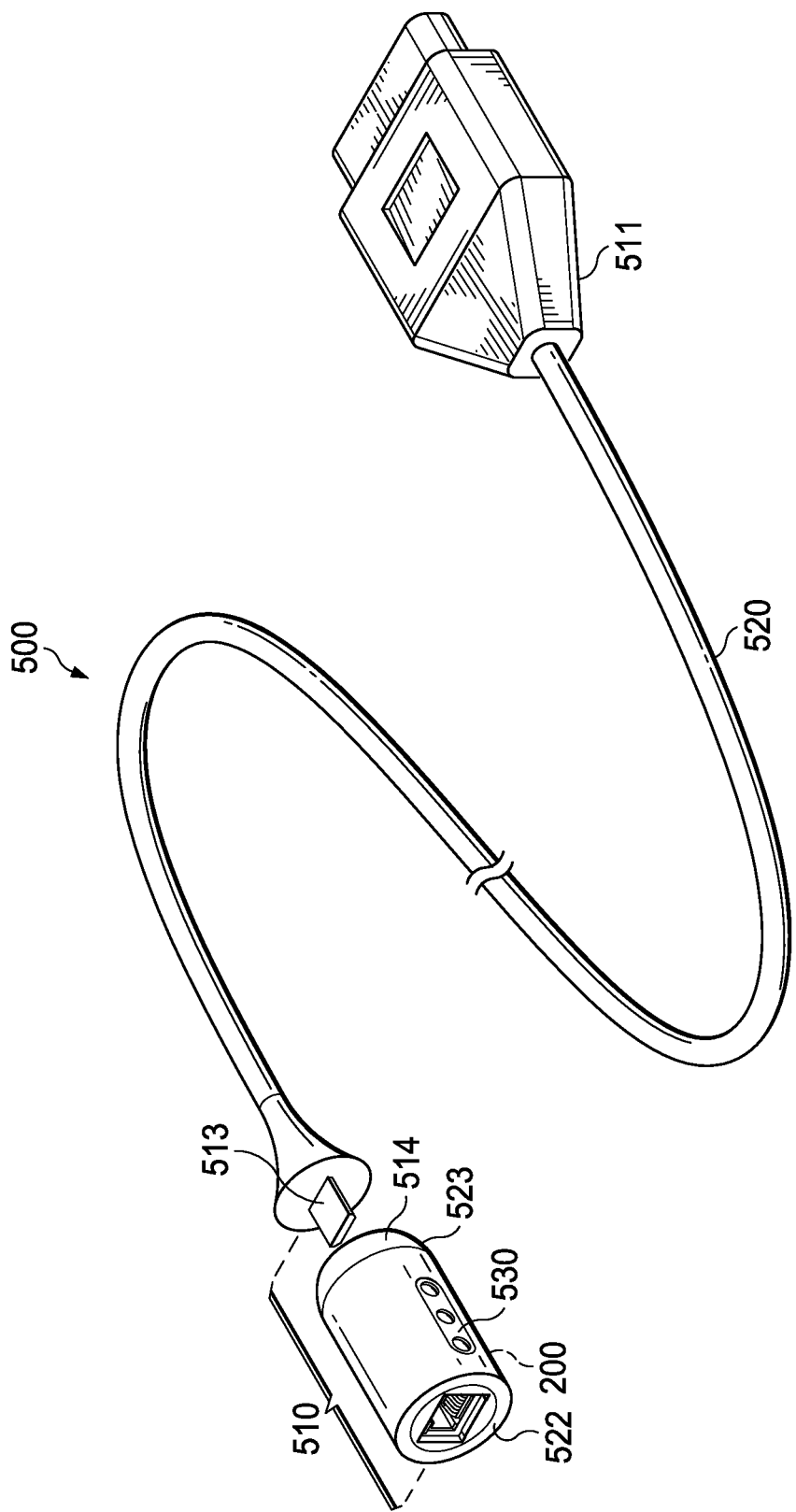
Figure 7:
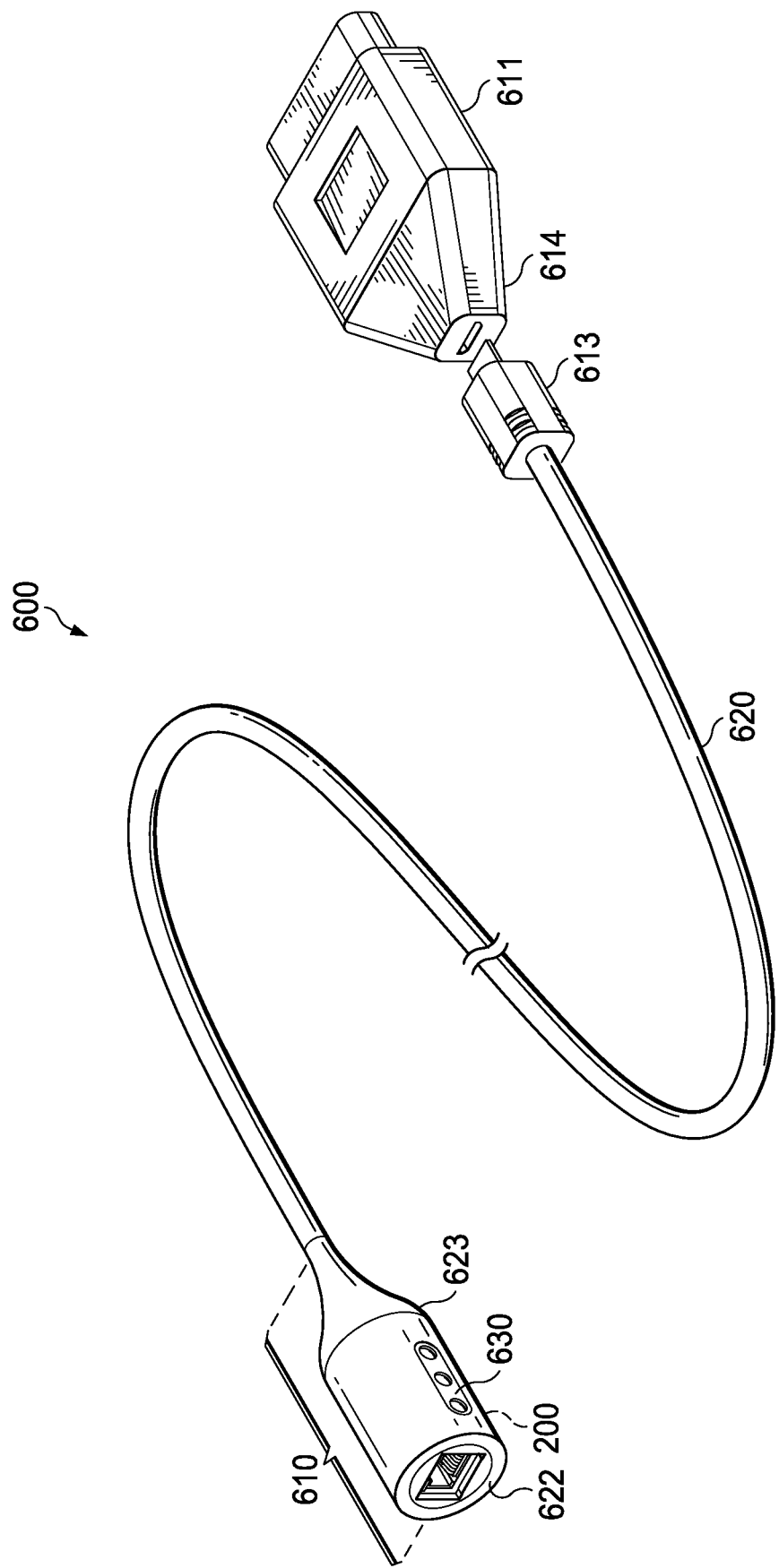

FIGS. 5-7 are simplified diagrammatic drawings illustrating the form factor of a smart cable according to different embodiments of the present disclosure. Referring now to FIG. 5, a smart cable 400 is implemented as an embodiment of the smart cable 170 of FIG. 2. In more detail, the smart cable 400 is in the form factor of a cable custom-made for a specific type of medical measurement system (e.g., a specific brand of hemodynamic monitoring system). The smart cable 400 has an elongate cable body 420 and includes both a distal connector assembly 410 and a proximal connector 411.

In some embodiments, the distal connector assembly 410 includes a connector interface 422 and a connector housing/strain relief element 423, which is typically molded from plastic or elastomer. In some embodiments, the distal connector assembly 410 has a circumference less than about 3 cm and a length less than about 5 cm. The electrical circuitry 200 discussed above with reference to FIG. 4 is implemented adjacent to the connector interface 422, typically inside the connector housing/strain relief element 423. For example, the electrical circuitry 200 may be implemented either as an application-specific integrated circuit (ASIC) or as a printed circuit assembly comprising discrete electrical components mounted on a small printed circuit board (PCB) or flexible substrate inside the connector housing/strain relief element 423. To accommodate its disposition inside the connector housing/strain relief 423, the electrical circuitry 200 is designed to occupy as little volume as possible. For example, in various embodiments, the electrical circuitry 200 occupies less than about 10 cm$^3$. In the case of an ASIC implementation, the circuitry 200 may occupy less than 1 cm$^3$.

The connector interface 422 is configured for mating with a diagnostic medical device, for example the pressure guidewire 152 of FIGS. 2-3. In some embodiments, the connector interface 422 is configured to be mated with the connector 168 of the pressure guidewire 152 shown in FIGS. 2-3. For an operator or user, the appearance and usability of the smart cable are essentially the same as those of a dumb extension cable used with a traditional medical pressure transducer. In some embodiments, the connector interface 422 is a keyed RJ-50 jack resembling an Ethernet jack.

In some embodiments, a status indication mechanism 430 is also implemented on the distal connector assembly 410. In the illustrated embodiment, the status indication mechanism 430 includes a plurality of differently colored LEDs that when activated in various combinations and sequences, indicate the status of the smart cable 400. For example, the status indication mechanism 430 may include a red LED and a green LED. Illumination of the red LED indicates an "unplugged" status for the smart cable 400 (e.g., no pressure guidewire rotary cable is attached). Simultaneous illumination of both the red and green LEDs produces the appearance of yellow light indicating an "initialization" status for the smart cable 400 (e.g., a pressure guidewire has been connected to the smart cable 400 and the circuitry is being initialized). Illumination of the green LED indicates a "ready-to-use" status for the smart cable 400 (e.g., the pressure guidewire is now connected and ready to be introduced into the patient). In other embodiments, the status indication can include various sequences of flashing and colors to indicate fault conditions or other information. The microcontroller 225 can deliver to the user additional fault or status information on the hemodynamic display monitor by presenting a distinctive non-physiologic waveform (such as a square wave or staircase) via the pressure sensor interface connector.

As is shown in FIG. 5, the elongate cable body 420 of the smart cable 400 is permanently joined with the distal connector assembly 410. The cable body 420 is flexible, and in some embodiments, the cable body 420 has a length in a range from about 1 meter to about 3 meters and a diameter in the range from about 3 mm to 6 mm, but other lengths and diameters are possible in alternative embodiments.

The proximal connector 411 is also permanently joined with the elongate cable body 420 in the embodiment shown in FIG. 5. The proximal connector 411 is configured for mating with a connector or a connector port of a specific type of medical measurement system, for example a hemodynamic monitoring system from a given manufacturer. In other words, the medical measurement system itself may have a proprietary input/output connector type. The proximal connector 411 of the smart cable 400 is customized for mating with the proprietary connector type of the particular brand of medical measurement system.

Based on the above discussions, it can be seen that the smart cable 400 serves as a "smart" interface between a diagnostic medical device and a medical measurement system while maintaining the appearance of a "dumb" cable. The circuitry 200 inside the smart cable 400 allows it to transfer the medical data captured by the diagnostic medical device to the medical measurement system in a format that is understood by the medical measurement system. The form factor of the smart cable 400 simplifies the tasks of the operator, since the operator needs merely to connect the smart cable 400 between the diagnostic medical device and the medical measurement system, as the smart cable 400 looks practically the same as a common extension cable.

FIG. 6 is a diagrammatic drawing illustrating the form factor of a smart cable 500 as an alternative embodiment of the smart cable 170 of FIG. 2. In more detail, the smart cable 500 has a form factor of a circuitry-containing connector that can be mated with a plurality of interchangeable cables that is each customized for mating with a specific type of medical measurement system (e.g., a specific brand of hemodynamic monitoring system). As shown in FIG. 6, the smart cable 500 has an elongate shape and includes a distal connector assembly 510, a proximal connector 511, and an elongate cable body 520 permanently joined to the proximal connector 511 but not to the distal connector assembly 510.

In some embodiments, the distal connector assembly 510 includes a connector interface 522 and a connector housing/strain relief element 523. In some embodiments, the distal connector assembly 510 has a circumference less than about 3 cm and a length less than about 8 cm. The electrical circuitry 200 discussed above with reference to FIG. 4 is implemented adjacent to the connector interface 522, typically inside the connector housing/strain relief element 523. For example, the electrical circuitry 200 may be implemented either as an application-specific integrated circuit (ASIC) or as a printed circuit assembly comprising discrete electrical components mounted on a small printed circuit board (PCB) or flexible substrate inside the connector housing/strain relief element 523. To accommodate its disposition inside the connector housing/strain relief 523, the electrical circuitry 200 is designed to occupy as little volume as possible. For example, in various embodiments, the electrical circuitry 200 occupies less than about 10 cm$^3$. In the case of an ASIC implementation, the circuitry 200 may occupy less than 1 cm$^3$.

The connector interface 522 is configured for mating with a diagnostic medical device, for example the pressure guidewire 152 of FIGS. 2-3. In some embodiments, the connector interface 522 is configured to be mated with the connector 168 of the pressure guidewire 152 shown in FIGS. 2-3. For an operator or user, the appearance and usability of the smart cable are essentially the same as those of a dumb extension cable used with a traditional medical pressure transducer. In some embodiments, the connector interface 522 is a keyed RJ-50 jack resembling an Ethernet jack.

In some embodiments, a status indication mechanism 530 is also implemented on the distal connector assembly 510. In the illustrated embodiment, the status indication mechanism 530 includes a plurality of differently colored LEDs that when activated in various combinations and sequences, indicate the status of the smart cable 500. For example, the status indication mechanism 530 may include a red LED and a green LED. Illumination of the red LED indicates an "unplugged" status for the smart cable 500 (e.g., no pressure guidewire rotary cable is attached). Simultaneous illumination of both the red and green LEDs produces the appearance of yellow light indicating an "initialization" status for the smart cable 500 (e.g., a pressure guidewire has been connected to the smart cable 500 and the circuitry is being initialized). Illumination of the green LED indicates a "ready-to-use" status for the smart cable 500 (e.g., the pressure guidewire is now connected and ready to be introduced into the patient). In other embodiments, the status indication can include various sequences of flashing and colors to indicate fault conditions or other information. The microcontroller 225 can deliver to the user additional fault or status information on the hemodynamic display monitor by presenting a distinctive non-physiologic waveform (such as a square wave or staircase) via the pressure sensor interface connector.

Unlike the smart cable 400 shown in FIG. 5, the cable body 520 of the smart cable 500 is not permanently joined with the distal connector assembly 510. Instead, the cable body 520 includes a cable connector 513, while the connector housing/strain relief 523 associated with distal connector assembly 510 includes a mating cable connector 514, so they can be connected together so as to couple the elongate cable body 520 to the distal connector assembly 510. Similarly to the smart cable 400, the cable body 520 of smart cable 500 is flexible, and in some embodiments, the cable body 520 has a length in a range from about 1 meter to about 3 meters and a diameter in the range from about 3 mm to 6 mm, but other lengths and diameters are possible in alternative embodiments.

The proximal connector 511 is permanently joined with the elongate cable body 520 in the embodiment shown in FIG. 6. The proximal connector 511 is configured for mating with a connector or a connector port of a specific type of medical measurement system, for example a hemodynamic monitoring system from a given manufacturer. In other words, the medical measurement system itself may have a proprietary input/output connector type. The proximal connector 511 of the smart cable 500 is customized for mating with that proprietary connector type of the particular brand of medical measurement system. Thus, the cable body 520 and the proximal connector 511 shown in FIG. 6 are only one version of the cable body 520 and the proximal connector 511. There may be a plurality of other versions of the cable body 520 and the proximal connector 511, each version being customized for a different connector type of a medical measurement system. Meanwhile, the distal connector assembly 510 remains the same, since it can be readily coupled with any version of the elongate cable body 520.

Similarly to the smart cable 400, the smart cable 500 serves as a "smart" interface between a diagnostic medical device and a medical measurement system while maintaining the appearance of a "dumb" cable. The circuitry 200 inside the smart cable 500 allows it to transfer the medical data captured by the diagnostic medical device to the medical measurement system in a format that is understood by the medical measurement system. The form factor of the smart cable 500 simplifies the tasks of the operator, since the operator needs merely to connect the smart cable 500 between the diagnostic medical device and the medical measurement system, as the smart cable 500 looks practically the same as a common extension cable.

FIG. 7 is a diagrammatic drawing illustrating the form factor of a smart cable 600 as yet another alternative embodiment of the smart cable 170 of FIG. 2. In more detail, the smart cable 600 has the form factor of a circuitry-containing connector and cable body that can be mated with a plurality of interchangeable proximal connector assemblies, each of which is customized for mating with a specific type of medical measurement system (e.g., a specific brand of hemodynamic monitoring system). As shown in FIG. 7, the smart cable 600 has an elongate shape and includes a distal connector assembly 610, a proximal connector assembly 611, and an elongate cable body 620 permanently joined to the distal connector assembly 610 but not to the proximal connector assembly 611.

In some embodiments, the distal connector assembly 610 includes a connector interface 622 and a connector housing/strain relief element 623. In some embodiments, the distal connector assembly 610 has a circumference less than about 3 cm and a length less than about 5 cm. The electrical circuitry 200 discussed above with reference to FIG. 4 is implemented adjacent to the connector interface 622, typically inside the connector housing/strain relief element 623. For example, the electrical circuitry 200 may be implemented either as an application-specific integrated circuit (ASIC) or as a printed circuit assembly comprising discrete electrical components mounted on a small printed circuit board (PCB) or flexible substrate inside the connector housing/strain relief element 623. To accommodate its disposition inside the connector housing/strain relief 623, the electrical circuitry 200 is designed to occupy as little volume as possible. For example, in various embodiments, the electrical circuitry 200 occupies less than about 10 cm$^3$. In the case of an ASIC implementation, the circuitry 200 may occupy less than 1 cm$^3$.

The connector interface 622 is configured for mating with a diagnostic medical device, for example the pressure guidewire 152 of FIGS. 2-3. In some embodiments, the connector interface 622 is configured to be mated with the connector 168 of the pressure guidewire 152 shown in FIGS. 2-3. For an operator or user, the appearance and usability of the smart cable are essentially the same as those of a dumb extension cable used with a traditional medical pressure transducer. In some embodiments, the connector interface 622 is a keyed RJ-50 jack resembling an Ethernet jack.

In some embodiments, a status indication mechanism 630 is also implemented on the distal connector assembly 610. In the illustrated embodiment, the status indication mechanism 630 includes a plurality of differently colored LEDs that when activated in various combinations and sequences, indicate the status of the smart cable 600. For example, the status indication mechanism 630 may include a red LED and a green LED. Illumination of the red LED indicates an "unplugged" status for the smart cable 600 (e.g., no pressure guidewire rotary cable is attached). Simultaneous illumination of both the red and green LEDs produces the appearance of yellow light indicating an "initialization" status for the smart cable 600 (e.g., a pressure guidewire has been connected to the smart cable 600 and the circuitry is being initialized). Illumination of the green LED indicates a "ready-to-use" status for the smart cable 600 (e.g., the pressure guidewire is now connected and ready to be introduced into the patient). In other embodiments, the status indication can include various sequences of flashing and colors to indicate fault conditions or other information. The microcontroller 225 can deliver to the user additional fault or status information on the hemodynamic display monitor by presenting a distinctive non-physiologic waveform (such as a square wave or staircase) via the pressure sensor interface connector.

Similarly to the smart cable 400, the elongate cable body 620 of the smart cable 600 is permanently joined with the distal connector assembly 610. The cable body 620 of the smart cable 600 is flexible, and in some embodiments, the cable body 620 has a length in a range from about 1 meter to about 3 meters and a diameter in the range from about 3 mm to 6 mm, but other lengths and diameters are possible in alternative embodiments.

Unlike the smart cable 400 in FIG. 5, the proximal connector assembly 611 is not permanently joined with the elongate cable body 620. Instead, the elongate cable body 620 includes a cable connector 613, and the proximal connector 611 includes a mating cable connector 614, so they can be connected together to couple the elongate cable body 620 to the proximal connector assembly 611. The proximal connector assembly 611 is also configured for mating with a connector or a connector port of a specific type of medical measurement system, for example a hemodynamic monitoring system from a given manufacturer. In other words, the medical measurement system itself may have a proprietary input/output connector type. The proximal connector assembly 611 of the smart cable 600 is customized for mating with that proprietary connector type of the particular brand of medical measurement system. Thus, the proximal connector assembly 611 shown in FIG. 7 is only one example version of the proximal connector assembly 611. There may be a plurality of proximal connector types, each version being customized for a different connector type of a medical measurement system. Meanwhile, the distal connector assembly 610 and the elongate cable body 620 remain the same, since they can be readily coupled with any version of the proximal connector assembly 611.

Similarly to the smart cable 400, the smart cable 600 serves as a "smart" interface between a diagnostic medical device and a medical measurement system while maintaining the appearance of a "dumb" cable. The circuitry 200 inside the smart cable 600 allows it to transfer the medical data captured by the diagnostic medical device to the medical measurement system in a format that is understood by the medical measurement system. The form factor of the smart cable 600 simplifies the tasks of the operator, since the operator needs merely to connect the smart cable 600 between the diagnostic medical device and the medical measurement system, as the smart cable 600 looks practically the same as a common extension cable.

It is understood that the concepts disclosed herein need not necessarily involve a separate smart cable. For instance, in certain alternative embodiments, the circuitry 200 discussed above may be implemented as a part of a disposable guidewire rotary cable assembly, for example inside the connector 168 (FIGS. 2-3) or the connector 230 (FIG. 4) of the rotary cable assembly. As such, the pressure guidewire 152 (FIGS. 2-4) with its associated smart rotary cable assembly becomes analogous to a conventional pressure sensor. The pressure guidewire with its associated smart rotary cable may then be connected to a medical measurement system via a standard dumb extension cable, as the electrical interface function is now performed by the circuitry 200 embedded inside the connector 168 of the rotary cable assembly.

Figure 8:
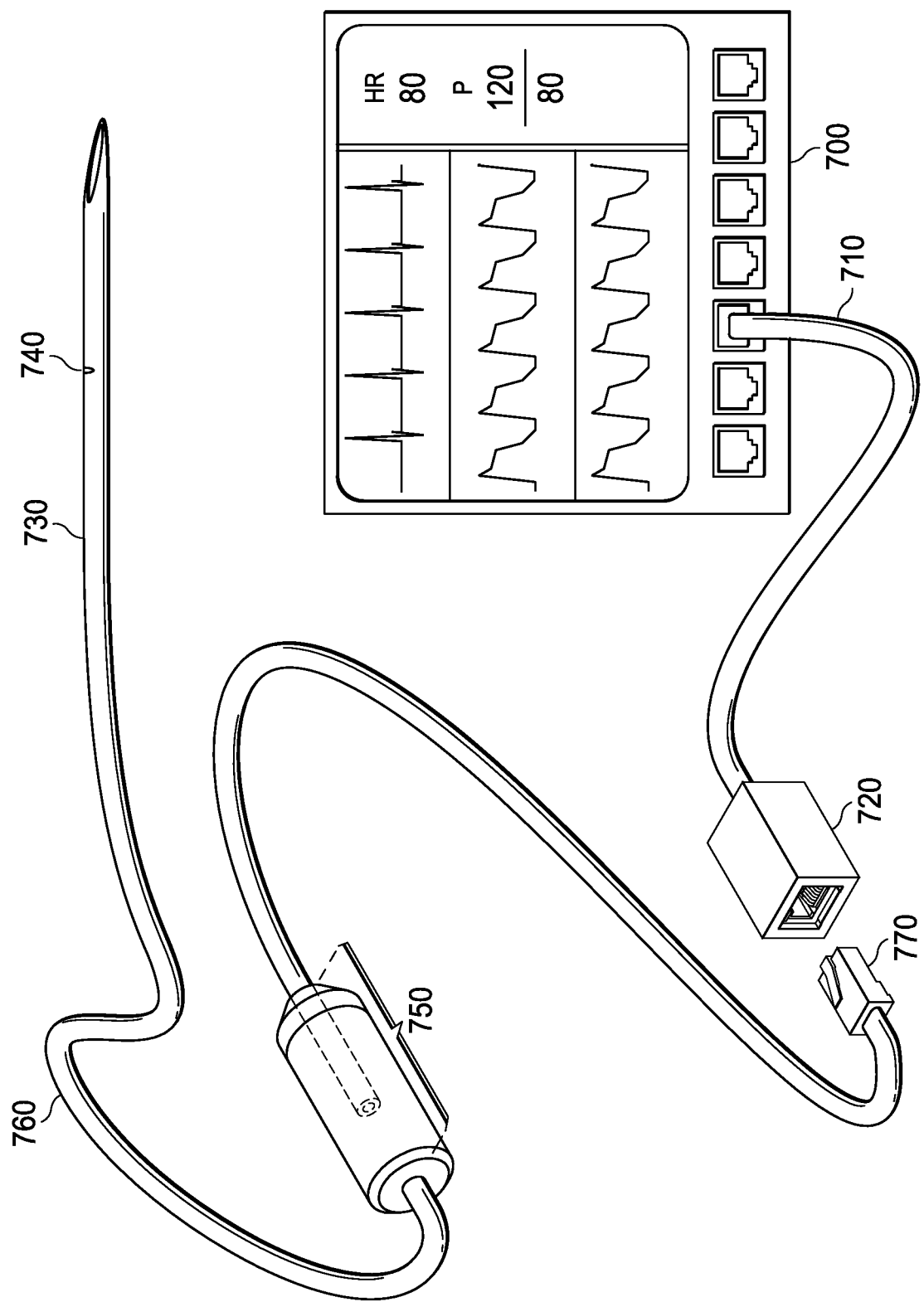
FIG. 8 is a diagrammatic view illustrating a medical system according to an embodiment of the present disclosure.

An example embodiment illustrating the above arrangement is shown in FIG. 8. A hemodynamic monitoring system 700 is used as an example medical measurement system. The hemodynamic monitoring system 700 has the necessary software installed thereon to perform functions such as normalization and calculation of FFR, iFR as discussed above. A conventional "dumb" extension cable 710 is connected to the hemodynamic monitoring system 700. Although not illustrated in detail, the dumb extension cable 710 has a customized proximal connector configured for mating with the pressure port of the particular brand of hemodynamic monitoring system 700. The dumb extension cable 710 also has a distal connector 720.

Meanwhile, a pressure guidewire 730 includes a pressure sensor 740. The pressure guidewire 730 is connected to a rotary cable assembly 750. The rotary cable assembly 750 includes an elongate cable 760 and a smart connector 770. The smart connector 770 contains the circuitry 200 (or equivalent thereto) discussed above. The smart connector 770 is also configured to be mated with the connector 720 of the dumb extension cable 710. The approach illustrated in FIG. 8 further simplifies the tasks for an operator, since it does not even require the "smart" cable such as the smart cables 400, 500, and 600 shown in FIGS. 5-7. Or stated differently, the "smart" cable is replaced by the smart connector 770 of the rotary cable assembly 750 combined with a common dumb extension cable 710.

FIG. 9 is a simplified flowchart illustrating a method 800 according to various aspects of the present disclosure. The method 800 includes a step 810, in which a distal end of an elongate cable is coupled to a diagnostic medical device through a distal connector of the cable. The diagnostic medical device is configured to gather biological data of a patient. In some embodiments, the diagnostic medical device includes a pressure guidewire, and the biological data includes blood pressure data.

The method 800 includes a step 820, in which a proximal end of the elongate cable is coupled to a medical measurement system through a proximal connector of the cable. The distal and proximal ends are opposite one another and are coupled together through a flexible cable body. In some embodiments, the medical measurement system includes a hemodynamic monitoring system.

In some embodiments, the distal and proximal connectors are each permanently joined with the cable body. In other embodiments, one of the proximal and distal connectors is detachably coupled with the cable body; and the other one of the proximal and distal connectors is permanently joined with the cable body.

The method 800 includes a step 830, in which the biological data is caused to be processed by an electronic component located inside the connector housing of the distal connector. The electronic component includes: an analog-to-digital converter (ADC) configured to receive the biological data and convert the biological data into digital signals; and a microprocessor coupled to an output of the ADC and configured to process the digital signals into a format that is readable by the medical measurement system. In some embodiments, the ADC is configured to digitize analog signals down to a microvolt level. In some embodiments, the electronic component occupies a volume less than about 10 cm$^3$.

The method 800 includes a step 840, in which the digital signals are caused to be processed by the microprocessor to be sent to, and analyzed by, the medical measurement system.

It is understood that additional steps may be performed before, during, or after the steps 810-840. For example, the method 800 may further include a step of monitoring a status of the elongate cable through a status indication mechanism located on an exterior of the cable housing. The status indication mechanism may be configured to visually display at least the following statuses of the medical device: an unplugged status, an initializing status, and a ready-to-use status. For example, the status indication mechanism may include a multi-colored light-emitting diode (LED) device, where each status of the medical device corresponds to a different light color emitted by the LED device.

It is understood that, although FFR and iFR are used as example proprietary programs to illustrate the various aspects of the present disclosure, the present disclosure is not limited to FFR or iFR. Still further, while a hemodynamic monitoring system is illustrated as the medical measurement system, the present disclosure is not limited thereto. The concepts discussed in the present disclosure may apply to any type of diagnostic medical device or medical measurement system including any of a variety of processing algorithms or software programs.

Persons skilled in the art will also recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A system, comprising:
an intravascular catheter or guidewire configured to obtain biological data while positioned within a blood vessel of a patient, wherein the intravascular catheter or guidewire comprises a proximal portion and a distal portion;
a first cable comprising an first flexible elongate body terminating in a first distal connector at a distal end of the first flexible elongate body and a first proximal connector at a proximal end of the first flexible elongate body; and
a second cable comprising a second flexible elongate body terminating in a second distal connector at a distal end of the second flexible elongate body and a second proximal connector at a proximal end of the second flexible elongate body,
wherein the proximal portion of the intravascular catheter or guidewire is configured to be coupled to the second distal connector,
wherein the first proximal connector is configured to be coupled to a hemodynamic monitoring system,
wherein the first cable is configured to be coupled to the second cable such that the hemodynamic monitoring system is in communication with the intravascular catheter or guidewire via the first cable and the second cable, and
wherein the first distal connector comprises:
an analog-to-digital converter (ADC) configured to receive the biological data via the second cable and convert the biological data into digital signals;
a microprocessor coupled to an output of the ADC and configured to:
process the digital signals into a format that is readable by the hemodynamic monitoring system; and
output the processed digital signals to the hemodynamic monitoring system via the first proximal connector;
a receptacle configured to receive the second proximal connector such that the first cable is coupled to the second cable; and
a housing, wherein the ADC, the microprocessor, and the receptacle are positioned within the housing, wherein only the first cable and the second cable are disposed between the hemodynamic monitoring system and the intravascular catheter or guidewire such that the receptacle of the first distal connector receiving the second proximal connector is the only one removable connection disposed between the first proximal connector and the second distal connector.

2. The system of claim 1, wherein the biological data includes blood pressure data.

3. The system of claim 1, wherein the ADC and microprocessor together have a volume less than about 10 cm$^3$.

4. The system of claim 1, further comprising: a status indication mechanism disposed on an exterior of the housing of the first distal connector, the status indication mechanism being configured to visually display at least the following status of the system: an unplugged status, an initializing status, and a ready-to-use status.

5. The system of claim 4, wherein the status indication mechanism includes a multi-colored light-emitting diode (LED) device, and wherein each status of the system corresponds to a different light color emitted by the LED device.

6. The system of claim 1, wherein the second cable comprises a rotary cable attached to the intravascular catheter or guidewire, wherein a proximal end of the rotary cable comprises the second proximal connector.

7. The system of claim 6, further comprising: a status indication mechanism disposed on an exterior surface of the rotary cable, the status indication mechanism being configured to visually display at least the following statuses of the system: an unplugged status, an initializing status, and a ready-to-use status.

8. The system of claim 7, wherein the status indication mechanism includes a multi-colored light-emitting diode (LED) device, and wherein each status of the system corresponds to a different light color emitted by the LED device.

9. The system of claim 1, wherein the housing comprises a first portion with a uniform cylindrical outer profile and a second portion with a taper that transitions from a first cross-sectional size of the uniform cylindrical outer profile to a second cross-sectional size.

10. The system of claim 9, wherein the ADC and the microprocessor are positioned within the second portion of the housing and the receptacle is positioned within the first portion of the housing.

11. The system of claim 10, wherein both the first portion of the housing and the second portion of the housing are permanently joined to the first flexible elongate member such that the receptacle, the ADC, and the microprocessor are permanently coupled to the first cable.

12. The system of claim 10, wherein the ADC and the microprocessor are coupled to a flexible substrate, wherein the flexible substrate is positioned within the second portion of the housing.

13. The system of claim 1, wherein the microprocessor is further configured to:
initiate a read operation to read a first portion of data from a memory device of the intravascular catheter or guidewire to determine whether or not the intravascular catheter or guidewire is coupled to the cable; and
in response to determining that the intravascular catheter or guidewire is coupled to the cable based on a successful read of the first portion of the data from the memory device, read a second portion of the data from the memory device, wherein the microprocessor is configured to process the digital signals further based on the second portion of the data from the memory device.

14. The system of claim 13, wherein the second portion of the data comprises calibration data, and wherein the microprocessor is configured to process the digital signals, based on the calibration data, into the format that is readable by the hemodynamic monitoring system.

15. The system of claim 1, wherein the first distal connector comprises a circumference less than 3 centimeters (cm) and a length less than 5 cm.

16. The system of claim 1, wherein a shape of a profile of the first distal connector is the same as a shape of a profile of the first flexible elongate body.

17. The system of claim 1, wherein the first distal connector comprises an additional ADC with a resolution different from the ADC, wherein a signal output of the additional ADC is indicative of whether or not the intravascular catheter or guidewire remains coupled to the second cable.

18. The system of claim 1, wherein the first distal connector further comprises a digital-to-analog converter (DAC), and wherein the microprocessor is coupled to the output of the ADC and to an input of the DAC via a serial communication bus.

19. The system of claim 1, wherein the first proximal connector and the first distal connector are permanently joined with the first flexible elongate body.

20. The system of claim 1, wherein the second proximal connector comprises a plug configured to be coupled to the first distal connector.

21. The system of claim 1, wherein, when the second proximal connector is received within the receptacle of the first distal connector, the second proximal connector is positioned proximate the ADC and the microprocessor of the first distal connector.

* * * * *